Figure 1:
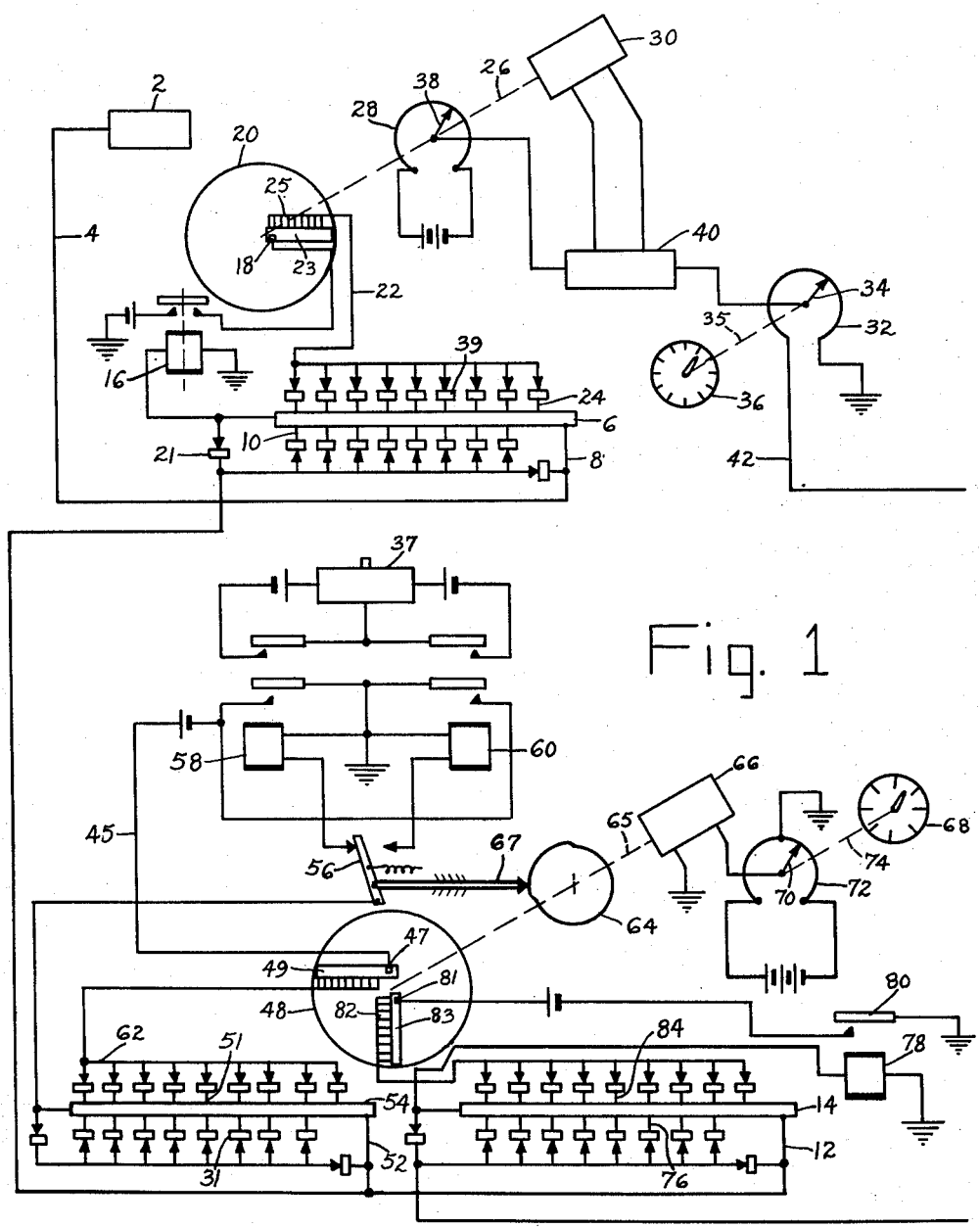

June 29, 1954   C. H. DOERSAM, JR   2,682,369
DIGITAL VEHICLE MOTION GENERATOR
Filed March 23, 1953   2 Sheets-Sheet 1

INVENTOR
CHARLES H. DOERSAM, JR.

BY *D.C. Snyder*
ATTORNEY

June 29, 1954  C. H. DOERSAM, JR  2,682,369
DIGITAL VEHICLE MOTION GENERATOR
Filed March 23, 1953  2 Sheets-Sheet 2
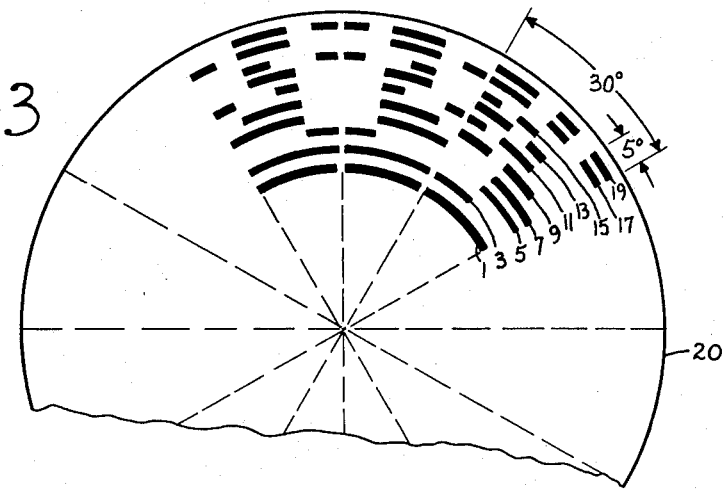
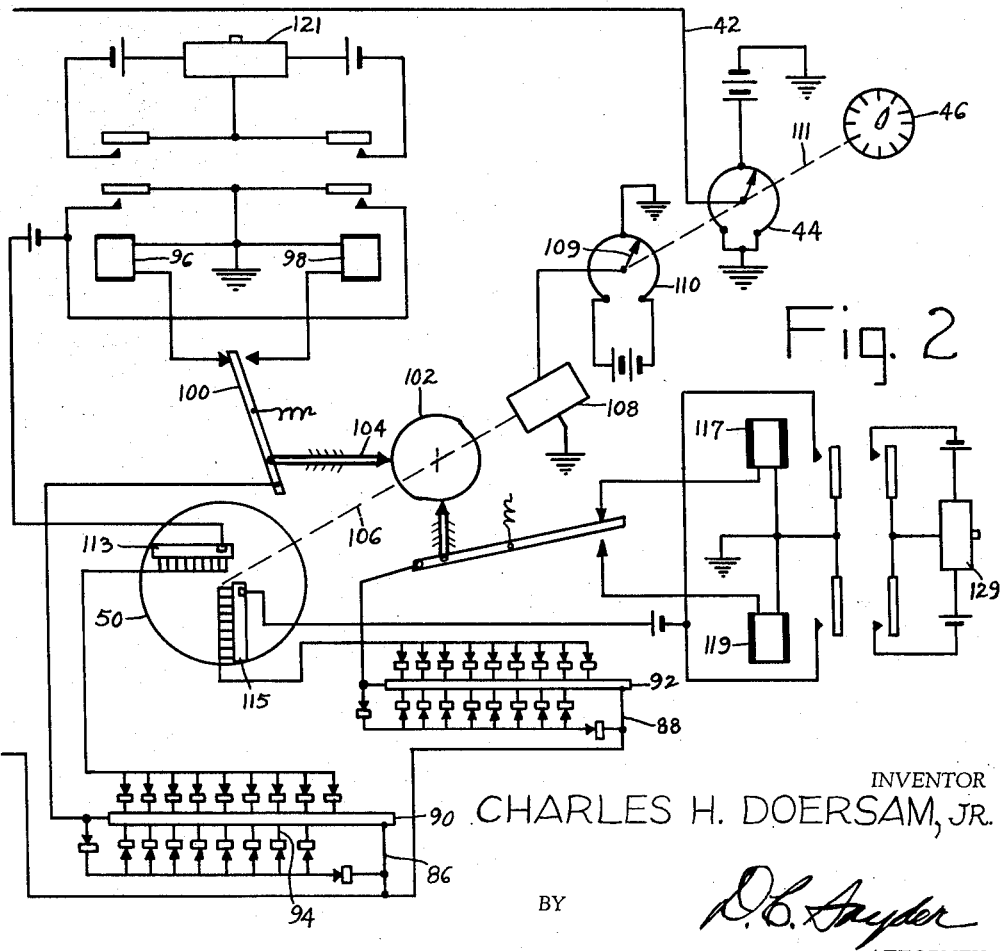
INVENTOR
CHARLES H. DOERSAM, JR.
BY
ATTORNEY Patented June 29, 1954

2,682,369

UNITED STATES PATENT OFFICE 2,682,369

DIGITAL VEHICLE MOTION GENERATOR

Charles H. Doersam, Jr., Port Washington, N. Y.

Application March 23, 1953, Serial No. 344,259

16 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention relates in general to the generation of the path or plot of a moving conveyance and more particularly to the synthetic generation of the motion of a subsurface, surface or air vehicle to be used in training devices.

Numerous and various methods are being used to synthetically generate the motion of subsurface, surface or air vehicles. The methods that are presently in use are mainly mechanical and electromechanical and are of the analogue type. There are many disadvantages to the analogue type of motion generators. Among some of these disadvantages are the lack of precision, relatively narrow range of operation because of relative high value of noise level; high cost, low life and poor reliability due to excessive wear of mechanical parts.

In an analog computer numbers are converted into physically measurable quantities of lengths, angular displacements, or voltages. The precision or accuracy of the results that can be obtained from a given analog device depends primarily upon the precision with which the equipment is fabricated and the precision with which the answers can be read. Every analog device is susceptible to human and systematic errors. These error producing factors are not present with a digital device. This invention comprises three manually operated controls that correspond to speed, rudder angle and, where the miniature plot represents the track of a submarine or airplane, elevator angle. When the plot of a surface ship is demonstrated, the elevator angle indicator is placed on zero or that reading which corresponds to zero tilt. This invention converts the input values of angles and speed into the Cartesian coordinates in the X, Y and Z planes. This said conversion is accomplished by means of digital computers, code wheels and supplemental equipment.

The values of the Cartesian coordinates are inserted into a standard plotting device or board that utilizes step motors or step relays as the prime mover of the plotting carriage. The voltages that are delivered to the plotting device are in the form of pulses. The pulses vary with time. Therefore, the number of voltage pulses that are delivered to the stepping motors or step relays during any specific time interval will increase or decrease in a relationship that is proportioned to the length of the specific vector or Cartesian coordinate of the desired axis.

In the present invention three standard plotting boards are interconnected and strategically placed with relation to each other. One plotting board shows the trace or plot of the vehicle in the XY plane. Another plotting board shows the trace or plot of the vehicle in the XZ plane. The third plotting board shows the trace or plot of the vehicle in the YZ plane.

Accordingly it is an object of this invention to provide a method of generating vehicle motion, utilizing a digital device of excellent precision, low cost and relatively free from human and systematic errors.

A further object is to provide a device to synthetically generate the motion of a subsurface vehicle or submarine, surface vehicle or ship, or an air vehicle or airplane.

A further object is to provide a system to generate the Cartesian coordinates of the vehicle from the course and speed information and the "characteristics of the vehicle."

Another object of the present invention is to demonstrate evasive maneuvers and operational tactics.

An additional object is to demonstrate the relationship between the various control elements of the vehicle and the response of the vehicle to movement of said control elements.

Another object is to demonstrate the path of a vehicle in either the XY plane, the XZ plane or the YZ plane or any one or combination of either two or in all three planes simultaneously.

Other objects and many of the attendant advantages of this invention will be readily appreciated as the same becomes better understood by reference to the following detailed description when considered in connection with the accompanying drawings wherein:

Fig. 1 is a wiring diagram showing the interconnecting circuitry and mechanical coupling that is required to obtain the Z and S components wherein the Z component is the projection of the course and speed vector R on the Z axis, and the S vector is the projection of the same vector R upon the horizontal plane, Fig. 2 is a wiring diagram showing the interconnecting circuitry and mechanical coupling that is required to obtain the X and Y components, and Fig. 3 is a diagram of the code wheel showing the conducting segments for each five degree interval starting from 30 degrees and extending through to 120 degrees.

In the drawings, item 2 designates a pulse generator that is a source of evenly and uniformly spaced electrical pulses of some convenient predetermined frequency. The design and construction of pulse generator 2 is of common knowledge to those experienced in the art, therefore it is not shown nor described in detail. The output of said pulse generator 2 is transmitted by means of conduit 4 to the trigger terminal 8 of speed counter 6. Speed counter 6 is similar in design and construction to the conventional flip-flop electronic counter circuit that is of common knowledge to those experienced in the art and, therefore, its internal construction and operation is not shown nor described in detail.

Speed counter 6 records each pulse that is transmitted from pulse generator 2. When each digit of the speed counter 6 is a one, a pulse spills out of the high order end. The output pulse is fed through rectifier elements 21 into the reset terminals 10 of speed counter 6 thus resetting each digit of each flip-flop circuit to zero. The pulse is also transmitted to the input terminal 12 of S counter 14 and the input terminal 52 of the Z counter 54.

The output pulse of speed counter 6 is also used to actuate delay relay 16. The delay relay 16 retards the input of information, from the code wheel, until the counter has been completely cleared of all information and each digit has been reset to zero. Delay relay 16, having a time delay of a few milli-seconds, allows a delayed electrical pulse to be transmitted to common brush 18 within brush holder 23. Brush 18 makes contact with the common segment 1 of the code wheel 20. Depending upon the angular location of code wheel 20, brushes 25 are located at a null position or receive a positive voltage. The brush receiving a positive voltage transmits the impulse through its exclusive conduit 22 and rectifier unit 39 to reset terminal 24.

The code wheel is composed of conducting segments on a nonconducting card as shown in Fig. 3. Fig. 3 illustrates the pattern of conducting segments for each five degree interval starting from thirty degrees and extending through to one hundred and twenty degrees. The following table of conducting and nonconducting segments was developed for increments having a length of one degree. Said calculated values are used for the two code wheels 48 and 50. For convenience only, the Fig. 3 illustrates conducting segments that are five degrees in length. For accurate results the conducting segments should be as small as possible. A convenient length was found to be one degree. Common segment 1 is electrically connected to each conducting strip of each segment 3, 5, 7, 9, 11, 13, 15, 17 and 19. A counter using nine digits is used in the present invention. However, the number of digits is not critical, and a counter containing more or fewer digits may be used. A table designating the pattern of conducting and nonconducting areas of each segment for each degree of rotation is as follows:

| Degrees | 3 | 5 | 7 | 9 | 11 | 13 | 15 | 17 | 19 |
|---|---|---|---|---|---|---|---|---|---|
| 0 | 0 | 0 | 0 | 0 | 0 | 0 | 0 | 0 | 0 |
| 1 | 0 | 0 | 0 | 0 | 0 | 0 | X | 0 | 0 |
| 2 | 0 | 0 | 0 | 0 | 0 | X | X | X | X |
| 3 | 0 | 0 | 0 | 0 | X | X | 0 | 0 | 0 |
| 4 | 0 | 0 | 0 | 0 | X | X | X | 0 | X |
| 5 | 0 | 0 | 0 | X | 0 | 0 | 0 | X | 0 |
| 6 | 0 | 0 | 0 | X | 0 | X | 0 | 0 | 0 |
| 7 | 0 | 0 | 0 | X | 0 | X | X | X | X |
| 8 | 0 | 0 | 0 | X | X | 0 | 0 | 0 | X |
| 9 | 0 | 0 | 0 | X | X | X | X | X | 0 |
| 10 | 0 | 0 | X | 0 | 0 | 0 | 0 | 0 | 0 |
| 11 | 0 | 0 | X | 0 | 0 | X | 0 | X | X |
| 12 | 0 | 0 | X | 0 | X | 0 | 0 | 0 | X |
| 13 | 0 | 0 | X | 0 | X | X | X | X | X |
| 14 | 0 | 0 | X | X | 0 | X | X | 0 | 0 |
| 15 | 0 | 0 | X | X | X | 0 | 0 | X | X |
| 16 | 0 | 0 | X | X | X | X | X | X | 0 |
| 17 | 0 | 0 | X | X | X | X | 0 | 0 | 0 |
| 18 | 0 | 0 | X | X | X | 0 | 0 | 0 | 0 |
| 19 | 0 | 0 | X | X | X | 0 | X | 0 | X |
| 20 | 0 | 0 | 0 | 0 | 0 | 0 | 0 | 0 | 0 |
| 21 | 0 | X | 0 | 0 | 0 | 0 | X | 0 | 0 |
| 22 | 0 | X | 0 | 0 | 0 | X | X | X | X |
| 23 | 0 | X | 0 | 0 | X | X | 0 | 0 | 0 |
| 24 | 0 | X | 0 | 0 | X | X | X | 0 | X |
| 25 | 0 | X | 0 | X | 0 | 0 | 0 | X | 0 |
| 26 | 0 | X | 0 | X | 0 | X | 0 | 0 | X |
| 27 | 0 | X | 0 | X | 0 | X | X | X | X |
| 28 | 0 | X | 0 | X | X | 0 | 0 | 0 | X |
| 29 | 0 | X | 0 | X | X | X | X | X | 0 |
| 30 | 0 | X | X | 0 | 0 | 0 | 0 | 0 | 0 |
| 31 | 0 | X | X | 0 | 0 | X | 0 | X | X |
| 32 | 0 | X | X | 0 | X | 0 | 0 | 0 | X |
| 33 | 0 | X | X | 0 | X | X | X | X | X |
| 34 | 0 | X | X | X | 0 | X | X | 0 | 0 |
| 35 | 0 | X | X | X | X | 0 | 0 | X | 0 |
| 36 | 0 | X | X | X | X | X | X | X | 0 |
| 37 | 0 | X | X | X | X | 0 | 0 | 0 | X |
| 38 | 0 | X | X | X | X | 0 | X | 0 | X |
| 39 | 0 | X | X | X | X | X | 0 | X | X |
| 40 | 0 | X | X | 0 | 0 | X | 0 | 0 | 0 |
| 41 | X | 0 | 0 | 0 | 0 | 0 | 0 | 0 | 0 |
| 42 | X | 0 | 0 | 0 | 0 | 0 | X | 0 | 0 |
| 43 | X | 0 | 0 | 0 | 0 | X | 0 | X | 0 |
| 44 | X | 0 | 0 | 0 | 0 | X | X | 0 | 0 |
| 45 | X | 0 | 0 | 0 | X | X | 0 | 0 | X |
| 46 | X | 0 | 0 | 0 | X | 0 | 0 | 0 | 0 |
| 47 | X | 0 | 0 | 0 | X | 0 | X | X | X |
| 48 | X | 0 | 0 | X | 0 | X | 0 | 0 | 0 |
| 49 | X | 0 | 0 | X | 0 | 0 | X | 0 | X |
| 50 | X | 0 | 0 | X | X | 0 | 0 | X | X |
| 51 | X | 0 | 0 | X | X | X | X | X | X |
| 52 | X | 0 | 0 | X | X | 0 | 0 | 0 | X |
| 53 | X | 0 | 0 | X | X | X | X | X | X |
| 54 | X | 0 | 0 | 0 | X | X | X | X | X |
| 55 | X | 0 | 0 | 0 | X | X | X | X | X |
| 56 | X | 0 | X | 0 | 0 | X | X | X | X |
| 57 | X | 0 | X | X | 0 | 0 | 0 | X | X |
| 58 | X | 0 | X | 0 | 0 | 0 | 0 | X | X |
| 59 | X | 0 | X | 0 | 0 | 0 | X | X | X |
| 60 | X | 0 | X | 0 | 0 | X | 0 | X | 0 |
| 61 | X | 0 | X | 0 | X | 0 | 0 | 0 | 0 |
| 62 | X | 0 | X | 0 | X | X | 0 | X | 0 |
| 63 | X | 0 | X | 0 | X | X | X | 0 | 0 |
| 64 | X | 0 | X | 0 | X | X | X | X | X |
| 65 | X | 0 | X | X | 0 | X | X | X | X |
| 66 | X | 0 | X | X | X | 0 | 0 | X | X |
| 67 | X | 0 | X | X | X | X | 0 | X | 0 |
| 68 | X | 0 | X | X | X | X | 0 | 0 | X |
| 69 | X | 0 | X | X | X | X | X | X | 0 |
| 70 | X | 0 | X | X | X | 0 | X | X | 0 |
| 71 | X | 0 | X | X | X | X | 0 | X | X |
| 72 | X | 0 | X | X | X | X | 0 | 0 | X |
| 73 | X | 0 | X | X | X | 0 | X | 0 | X |
| 74 | X | 0 | X | X | X | 0 | X | X | X |
| 75 | X | 0 | X | X | X | X | X | X | X |
| 76 | X | 0 | X | X | X | 0 | X | 0 | 0 |
| 77 | X | 0 | X | X | X | X | 0 | X | 0 |
| 78 | X | 0 | X | X | X | X | X | X | 0 |
| 79 | X | 0 | X | X | X | X | X | 0 | X |
| 80 | X | 0 | X | 0 | 0 | 0 | 0 | 0 | 0 |
| 81 | X | X | X | 0 | 0 | 0 | 0 | 0 | 0 |
| 82 | X | X | X | 0 | 0 | 0 | 0 | 0 | 0 |
| 83 | X | X | X | 0 | 0 | 0 | X | 0 | 0 |
| 84 | X | X | X | 0 | 0 | X | 0 | X | 0 |
| 85 | X | X | X | 0 | 0 | X | 0 | 0 | X |
| 86 | X | X | X | 0 | 0 | X | X | X | X |
| 87 | X | X | X | 0 | 0 | 0 | 0 | X | 0 |
| 88 | X | X | X | 0 | 0 | 0 | X | X | 0 |
| 89 | X | X | X | 0 | 0 | 0 | 0 | 0 | 0 |
| 90 | X | X | 0 | 0 | 0 | 0 | X | X | 0 | where 0 is non-conducting and X is a conducting segment.

The above table applies to the code wheels 48 and 50. The pattern for code wheel 20 is not illustrated but is designated by the following table:

| Degrees | Segments | | | | | | | | |
|---|---|---|---|---|---|---|---|---|---|
| | 19 | 17 | 15 | 13 | 11 | 9 | 7 | 5 | 3 |
| 0 | 0 | 0 | 0 | 0 | 0 | 0 | 0 | 0 | 0 |
| 1 | 1 | 0 | 0 | 0 | 0 | 0 | 0 | 0 | 0 |
| 2 | 0 | 1 | 0 | 0 | 0 | 0 | 0 | 0 | 0 |
| 3 | 1 | 1 | 0 | 0 | 0 | 0 | 0 | 0 | 0 |
| 4 | 0 | 0 | 1 | 0 | 0 | 0 | 0 | 0 | 0 |
| 5 | 1 | 0 | 1 | 0 | 0 | 0 | 0 | 0 | 0 |
| 6 | 0 | 1 | 1 | 0 | 0 | 0 | 0 | 0 | 0 |
| 7 | 1 | 1 | 1 | 0 | 0 | 0 | 0 | 0 | 0 |
| 8 | 0 | 0 | 0 | 1 | 0 | 0 | 0 | 0 | 0 |
| 9 | 1 | 0 | 0 | 1 | 0 | 0 | 0 | 0 | 0 |
| 10 | 0 | 1 | 0 | 1 | 0 | 0 | 0 | 0 | 0 |
| 11 | 1 | 1 | 0 | 1 | 0 | 0 | 0 | 0 | 0 |
| 12 | 0 | 0 | 1 | 1 | 0 | 0 | 0 | 0 | 0 |
| 13 | 1 | 0 | 1 | 1 | 0 | 0 | 0 | 0 | 0 |
| 14 | 0 | 1 | 1 | 1 | 0 | 0 | 0 | 0 | 0 |
| 15 | 1 | 1 | 1 | 1 | 0 | 0 | 0 | 0 | 0 |
| 16 | 0 | 0 | 0 | 0 | 1 | 0 | 0 | 0 | 0 |
| 17 | 1 | 0 | 0 | 0 | 1 | 0 | 0 | 0 | 0 |
| (Continues with binary logic) | | | | | | | | | |
| 90 | 0 | 1 | 0 | 1 | 1 | 0 | 1 | 0 | 0 |

Referring to the code wheels 48 and 50, the 91 degree sector of conducting and non-conducting segments is identical to the 89 degree sector. The 180 degree sector is identical to the zero degree sector. The 270 degree sector is identical to the 90 degree sector and the 359 degree sector is identical to the 1 degree sector. Therefore the pattern goes from a minimum at zero to a maximum at 90 degrees then back to a minimum at 180 degrees, up to a maximum at 270 degrees and down to a minimum at zero degrees. The pattern is proportional to the sine function.

Referring to code wheel 20, the pattern covers one half of the wheel from 270 degrees to 90 degrees. The pattern of the third quadrant is a mirror image of the pattern of the first quadrant. Therefore, a maximum reading is obtained at the 270 degree sector, decreasing to a minimum at the zero degree sector and increasing to a maximum at the 90 degree sector.

Each conducting strip 3, 5, 7, 9, 11, 13, 15, 17 and 19 makes electrical contact with a separate digit of the respective counter through a separate brush. The code wheel is divided into twelve 30 degree sectors, each sector being electrically isolated from the adjoining sectors on opposite sides.

The electrical pulse that is delivered to the common conducting strip 1 of code wheel 20 is transmitted to each conducting segment 3, 5, 7, 9, 11, 13, 15, 17 and 19. The angular position of code wheel 20 determines which of the brushes 25 receive a voltage pulse. The voltage pulse is transmitted to appropriate conduits 22. Conduits 22 are electrically connected to the "set" terminals 24, of the flip-flop circuits of the speed counter 6, through rectifier units 21. Although the drawing shows a single line between units 39 and brushes 25, actually this is a cable connection containing nine such conductors, one between each unit 39 and a corresponding brush. The showing is for convenience only. Rigidly attached to rotatable shaft 26 is a speed code wheel 20 and a variable resistor 28, both driven through shaft 26 by electric motor 30. The rotation of shaft 26 rotates contact arm of the potentiometer 28 to vary the resistance according to the degree of rotation of shaft 26. Therefore, every angular displacement of the shaft will result in a voltage change in the conductor leading from contact arm 38.

Movable contact 34 of rheostat 32 is mechanically connected to the manual input engine order or speed indicator dial 36 through rotatably mounted shaft 35. Variable rheostats 28 and 32 are electrically connected to motor 30 through the servo amplifier 40. The high or ungrounded end 42 of rheostat 32 is electrically connected to another variable voltage control unit 44 of Figure 2.

Variable control unit 44 is mechanically connected to the Rudder Position hand dial indicator 46 so that as said dial 46 is rotated the voltage between lead 42 and ground of variable resistor 32 is varied, the amount of said voltage variation being dependent upon the angular rotation or displacement of hand dial 46.

Returning to Figure 1, servo amplifier 40, in combination with motor 30 and variable resistors 28 and 32 perform as a null seeking mechanism. A voltage differential between movable contact arms 38 and 34 of rheostats 28 and 32 respectively, will cause motor 30 to rotate shaft 26 in the proper direction. When contact arm 38 has been displaced to a new position on rheostat 28 so that the servo amplifier 40 senses no voltage differential between the two input leads that originate at contact arms 38 and 34, motor 30 will stop rotating.

Code wheels 48 of Figure 1, and 50 of Figure 2, are similar in design and construction to code wheel 20. Slip ring 1 is the common slip ring of code wheel 20. In the present invention a nine digit code is utilized comprising five hundred and twelve possible combinations. However, there is nothing to limit this principle to nine digits. Conducting portions 3, 5, 7, 9, 11, 13, 15, 17 and 19 are electrically connected to the common conducting segment 1. The code wheel 20 generates a binary code on electrical brushes 25 located in brush holder 23. The code is proportional to the angular displacement of code wheel 20, the angular displacement of said code wheel 20 being proportional to the speed setting of the engine order shaft. This binary number is transferred into speed counter 6, after each digit of counter 6 has been set to zero by the overflow pulse of counter 6. By this method the counter is set to a point between zero and all "ones," the initial setting being proportional to the speed setting of dial 36. Therefore, the number of pulses that are present on the set lines 22 of the speed counter 6 is proportional to the setting of the engine order position.

The Z counter 54 and S counter 14 are of the same design and construction as the speed counter. In the present invention where a three dimensional plot is required, the vector R represents the course and speed of the vehicle. The Z component is the projection of R on the Z axis and is equal to $R \sin \psi$, where $\psi$ represents the angle between R and the horizontal plane. The S vector is the projection of the vector R upon the horizontal plane. The angle between the vector S and the X axis is represented by $\theta$. Therefore vector $S$ equals $R \cos \psi$. The X component is equal to $R \cos \psi \cos \theta$ and the Y component is equal to $R \cos \psi \sin \theta$.

The Z counter 54 and S counter 14 receive the trigger pulses from the speed counter 6, the interval of time between pulses depending upon that interval required for the speed counter 6 to read all "ones" from the preset condition. When the Z counter 54 reads all "ones" a pulse is spilled out. This pulse resets each digit of the Z counter 54 to zero. The output pulse also passes through a positive-negative switch 56 and then to a time delay relay 58 or 60. The time delay relay activated is determined by the position of the positive-negative switch 56. The time delay relays have the required numbers of contacts. One set of contacts of the selected relay 58 or 60 cause a voltage pulse to activate stepping motor 37. The other set of contacts of the selected relay 58 or 60 sends a voltage pulse through conductor 45 to the common brush 47 located in adapter 49. Brush 47 contacts common segment 1 of the code wheel 48. The segments on wheel 48 are not shown, they being the same as those on wheel 50. The pulse of wheel 48 is transmitted through pickup brushes similar to brushes 25 to reset terminals 51 of the Z counter 54. The code that is inserted into the reset terminals 51 of Z counter 54 represents a number that is proportional to the angle of climb or dive of the air or sea vehicle that is being demonstrated. The positive-negative switch 56 is controlled by the action of cam 64 and cam follower 67.

Cam 64 and positive-negative switch 56 designates the positive or negative direction of the vehicle that is being demonstrated. The direction of the step relay or step motor is determined by the action of the relay activated. If relay 96 is activated the step motor or step relay 121 will revolve through an arc of a predetermined number of degrees in one direction. If relay 98 is activated the step motor or step relay 121 will revolve through the same angular displacement in the opposite direction. Cam 64 controls the cam follower 67 by means of a rise, of the required height, on the cam periphery, said rise extending through an arc of 90°. The rotational speed of cam 64 is controlled by the manually operated angle of climb or dive dial indicator 68. The indicator 68 is mechanically connected to the movable contact arm 70 of variable voltage control device 72 through rotatably mounted shaft 74. The movable contact arm 70 of potentiometer 72 is electrically connected to reversible motor 66. Motor 66 is connected to shaft 65. Cam 64 and code wheel 48 are securely attached to shaft 65 so that there is no relative movement or angular displacement between shaft 65, cam 64 and code wheel 48. As the angular displacement of the manually operated angle of climb or dive dial indicator 68 is increased from the zero position, the voltage that appears across motor 66 is increased. The motor 66 will continue to rotate, thus turning shaft 65, until dial indicator 68 is returned to the zero or neutral position. The greater the angular displacement of dial indicator 68, the faster motor 66 will revolve.

If an angle of climb will cause motor 66 to revolve in a clockwise direction, then an angle of dive will cause motor 66 to revolve in a counter-clockwise direction. Said S counter 14, as mentioned previously, is identical in internal operation and construction to the Z counter 54 and the speed counter 6. The electrical output pulse or spill-over of said S counter 14 is fed to the reset terminals 76 of the S counter 14, thus resetting each digit to zero. The same output pulse also actuates a time delay relay 78. This relay 78 operates a set of electrical contacts 80 that allows an electrical voltage pulse to pass through the common brush 81 located in brush adapter 83, to the common segment of code wheel 48. The voltage pulse then proceeds through said common segments of code wheel 48 to the brushes 82 that make electrical contact with the various conducting segments. These voltages are then fed into set terminals 84 of said S counter 14 thus presetting the S counter 14 to a reading between all zeros and all "ones," the reading being proportional to the angle of climb or dive setting.

The output pulse of the S counter 14 is also fed to the trigger terminals 86 and 88 of Y counter 90 and X counter 92 respectively as shown in Fig. 2. The construction and operation of the Y counter 90 and the X counter 92 are similar to the construction and operation of the speed counter 6, the Z counter 54 and the S counter 14. The electrical output pulse of the Y counter 90 is fed to the reset terminals 94, thus resetting each digit to zero. The electrical output pulse is also transmitted to one of two time delay relays 96 or 98 through a positive-negative selector switch 100.

The position of the positive-negative selector switch 100 is controlled by cam 102 acting upon cam follower 104. Follower 104 is mechanically connected to the pivot arm of switch 100. Cam 102 has a raised portion, on its periphery, of sufficient height and extending through an arc of 180°. Code wheel 50 and cam 102 are securely attached to shaft 106 so that the code wheel 50 and the cam 102 maintain a constant fixed angular relationship to each other. The shaft of motor 108 is connected to shaft 106 so that any rotational movement of the motor 108 will result in a corresponding equal angular displacement of the code wheel 50 and the cam 102. Movable arm and contact 109 of rheostat or potentiometer 110 is electrically connected to the control windings of the reversible motor 108. The movable arm or contact 109 is controlled by and mechanically connected to the manually operated angle of bearing dial indicator 46 through rotatably mounted shaft 111. Any angular movement or rotation of dial 46 will result in a new setting of contact arm 109. A new voltage is sent to the motor 108, thus resulting in a change of its armature speed. The potentiometers 44 and 110 maintain the same relative angular position with respect to each other since they are each controlled by and mechanically coupled to the same manually controlled angle of bearing dial indicator 46. The operation of the X counter 92, internally and externally, is identical to that of the Y counter 90 in each and every respect. The Y counter 90 and the X counter 92 utilize, in their operation, the same code wheel 50 and the same cam wheel 102. The brushes that are located within brush holder 113 are electrically connected to the Y counter 90, and the brushes that are located within brush holder 115 are electrically connected to the X counter 92. The brushes within holder 113 are displaced from those brushes within holder 115 by an angle of 90 degrees. The brushes that are interconnected with the Y counter 90 read the sine function while the brushes that are interconnected with the X counter read the cosine function.

The operation of relays 96 and 98 and step motor or step relay 121 determines the sign of the Y component. The operation of relays 117 and 119 and step motor or step relay 129 determines the sign of the X component. The methods of determining the signs of the X and Y components are identical in operation to the method explained above for determining the sign of the Z component.

To demonstrate, the invention is operated as follows: The plus generator 2 is set to generate and transmit electrical pulses at some convenient rate. The three inputs, Engine Order, Angle of Climb and Angle of Bearing are set at 36, 68 and 46 to the desired readings. When the plot of a surface ship is being reproduced the angle of climb input dial is set at the neutral position or zero tilt.

In the present illustration the generation of a surface ship is to be reproduced, therefore the angle of climb dial indicator is set on the zero or neutral position. Engine Order dial 36 is set to an appropriate speed. Code wheel 20 is rotated to a new position determined by the engine order dial and controlled by variable rheostats 32 and 28, servo amplifier 40 and servomotor 30. The pulses from the pulse generator are fed into the speed counter 6 which counts at a constant rate until each digit reads "one." At this instant a pulse spills out the high order end of the counter and performs three separate functions. First, the voltage pulse resets the speed counter to read all zeros. Second, the voltage pulse, after passing through the engine order code wheel 20, resets the speed counter to some number, between all zeros and all ones, that is proportional to the selected speed. Third, the electric pulse is transmitted to the input terminals 52 and 12 of the Z counter 54 and the S counter 14, respectively. The voltage pulse that is transmitted to the S counter will, in effect, be transmitted directly to the input terminals 88 and 86 of the X counter 92 and the Y counter 90, respectively.

This condition occurs because the vehicle being demonstrated is a surface ship and the angle of climb indicator has been set on zero or neutral tilt. The X counter 92 and Y counter 90 continue to count the output pulses of the speed counter 6 until the counters or one of them, read all "ones." At this instant a voltage pulse spills out the high order end of the counter that reads all "ones." Since the design, construction and operation of the X and Y counters are identical, the operation of the X counter 92 only will be discussed. The output pulse of the X counter performs a number of functions. First, the electric pulse resets the X counter to read all zeros. Second, the pulse is sent to step relay or step motor that controls the X axis of a plotting board. The positive or negative movement of the carriage in the X axis is controlled by a step motor or a step relay. In the step motor or step relay, a voltage applied to one set of contacts will result in a clockwise rotation and a voltage applied to the other set of contacts will result in a counter-clockwise rotation. A cam controlled switch selects the path for the electric pulse and, therefore, the electric pulse travels to one set of step motor or step relay contacts when the ship is proceeding in one direction and to the other set of contacts of the step motor or step relay when the ship is proceeding in the other direction. The above illustration was for a straight line course. To turn or maneuver the "ship" the angle of bearing dial 46 is rotated in the desired direction to the selected angular displacement. An angular displacement of the bearing dial has a two fold effect. First, the speed and direction of rotation of motor 108 is controlled by a potentiometer 110 having a grounded center tap and slaved to the angle of bearing dial 46. The speed and the direction of rotation are determined by the angular displacement and direction of displacement of the bearing input wheel. The motor shaft rotates the positive-negative switch controlling cam 102 and the code wheel 50 that is utilized for the XY axes. The cam and the code wheel will continue to rotate until the bearing wheel is returned to the zero or neutral position. The second effect caused by a left or right rudder angle is, in effect, a decrease in speed of the ship. This is accomplished by a decrease of voltage across potentiometer 32 (Fig. 1) resulting in a change of the angular displacement of the code wheel that is utilized with the speed counter. Therefore, the greater the rudder angle, the greater the decrease in ship's speed.

To illustrate a true trace of the generated course, the plotting board for the XY axes is placed in a horizontal position and the XZ and YZ axes plotting boards are placed on end and next to the XY axes plotting board.

When the trace of a submarine or aircraft is demonstrated, the Z component is obtained in the same manner as the X component is obtained. The S counter, in conjunction with the code wheel that it utilizes, controls the frequency of pulses that are delivered to the input terminals of the X and Y counters. An angular displacement of the angle of climb or dive dial will cause the cam wheel and code wheel of the Z axis to rotate continuously at a rate determined by the magnitude of the displacement. The cam and code wheel will continue to rotate until the angle of climb or dive dial is returned to the zero or neutral position.

From the foregoing, it will be realized by those skilled in the art that the generation of the path of a moving vehicle can be accomplished in other ways.

One modification of the present invention is where the third or Z axis is not required. In this instance, Z counter 54 and S counter 14 are eliminated along with their necessary auxiliary equipment including code wheel 48, cam 64 and the required relays. The Z counter and S counter are eliminated where it is desired to generate the path of a surface vehicle only. In said mentioned utilization of the present invention, the output of the speed counter 6 is connected directly to the input or trigger terminal of the X counter and the Y counter.

Furthermore, another modification of the present invention is to eliminate the pulse generator 2 and replace speed counter 6 and code wheel 20 with a pulse generator having a frequency that can be varied. Shaft 26 is then connected to the frequency control unit of the variable frequency pulse generator and the output of the generator is then connected to the input or trigger terminal of the Z counter and S counter or, if these counters have been eliminated, then the generator output is connected to the input or trigger terminal of the X counter and Y counter.

All parts that are common to the original and modified form of the present invention function in the manner as described initially.

Obviously many modifications and variations of the present invention are possible in the light of the above teachings. It is therefore to be understood that within the scope of the appended claims the invention may be practiced otherwise than as specifically described.

What is claimed is:

1. A device for generating the Cartesian coordinates of the position of a vehicle comprising a variable frequency pulse source, means to vary the frequency of said pulse source to be proportional to the speed of the vehicle, a combination of counters electrically connected to indicate the output of said pulse generator, second means to insert bearing information into said combination of counters and third means to orient the output of said counters to the proper quadrant so that the X and Y axes will be generated to indicate the plot of a surface vehicle.

2. A device for generating the Cartesian coordinates of the position of a vehicle comprising a pulse source variable in proportion to the speed of the vehicle, counters electrically connected to indicate the output of said pulse source, means to insert climb or dive information of the vehicle into said counters, means to orient the output of one of said counters that generates the Z axis component, a plurality of counters to receive the output of one of said last mentioned counters, means to insert angle of bearing information into said plurality of counters, and means to orient the output of said last plurality of counters to generate the X and Y axes components of the path of the vehicle.

3. A device for continuously generating the position of a vehicle comprising a source of pulses, a counter connected to receive and count said pulses, means to insert vehicle speed information into said counter, a plurality of counters connected to said first counter, means to insert angle of bearing information into said plurality of counters, and means to orient the output of said plurality of counters that generate the component of the vehicle in the X axis and Y axis.

4. A device for continuously generating the position of a vehicle comprising a source of pulses, a counter connected to receive said pulses, means to insert vehicle speed information into said counter, a set of counters connected to said first counter, second means to insert climb or dive information of vehicle into said plurality of counters, third means to orient the output of one of said plurality of counters to generate the component in the Z axis, a second set of counters to receive the output of one of the said first set of counters, fourth means to insert angle-of-bearing information into said second set of counters, fifth means to orient the output of said second set of counters to generate the components of the vehicle in the X axis and in the Y axis.

5. The combination of claim 1 wherein said first mentioned means to vary the frequency of said pulse source comprises a servo system that is controlled by a manual input speed control and a manual input rudder position.

6. The combination of claim 2 wherein said pulse source comprises a servo system that is controlled by a manual input speed control and a manual input rudder position.

7. The combination of claim 2 wherein said mentioned means to insert climb and dive information into said combination of counters comprises a code wheel, a variable speed motor mechanically connected to rotate said code wheel, a variable voltage control device electrically connected to vary and control the speed of rotation of said motor.

8. The combination of claim 4 wherein said mentioned means to insert climb and dive information into said combination of counters comprises a code wheel, a variable speed motor mechanically connected to rotate said code wheel, a variable voltage control device electrically connected to vary and control the speed of rotation of said motor.

9. The combination of claim 1 wherein said third mentioned means to orient the output of said counters to the proper quadrant comprises a cam, a switch containing a plurality of electrical contacts activated by said cam and a stepping means connected to the switch such that one set of contacts will cause the stepping means to rotate in a direction opposite to that direction obtained from the other set of contacts.

10. The combination of claim 2 wherein said third and fifth mentioned means to orient the output of said counters to the proper quadrant comprises a cam, a switch containing a plurality of electrical contacts activated by said cam and a stepping means connected to the switch such that one set of contacts will cause the stepping means to rotate in a direction opposite to that direction obtained from the other set of contacts.

11. The combination of claim 3 wherein said third mentioned means to orient the output of said counters to the proper quadrant comprises a cam, a switch containing a plurality of electrical contacts activated by said cam and a stepping means connected to the switch such that one set of contacts will cause the stepping means to rotate in a direction opposite to that direction obtained from the other set of contacts.

12. The combination of claim 4 wherein said third and fifth mentioned means to orient the output of said counters to the proper quadrant comprises a cam, a switch containing a plurality of electrical contacts activated by said cam and a stepping means connected to the switch such that one set of contacts will cause the stepping means to rotate in a direction opposite to that direction obtained from the other set of contacts.

13. The combination of claim 1 wherein said frequency varying means includes a motor and a voltage control unit therefor variable according to an engine order input and wherein said second mentioned means to insert angle of bearing information into said combination of counters comprises a code wheel, a motor mechanically connected to rotate said code wheel, a manual angle of bearing input, a variable voltage unit operated by said manual angle of bearing input and electrically connected to control said motor; a second variable voltage unit connected to said first mentioned variable voltage unit to vary the voltage across the motor control variable voltage unit that represents the engine order input.

14. The combination of claim 2 wherein means is provided for varying said pulse source, said means comprising a motor and a voltage control unit therefor variable according to an engine order input and wherein said fourth mentioned means to insert angle of bearing information into said combination of counters comprises a code wheel, a motor mechanically connected to rotate said code wheel, a manual angle of bearing input, a variable voltage unit operated by said manual angle of bearing input and electrically connected to control said motor; a second variable voltage unit connected to said first mentioned variable voltage unit to vary the voltage across the motor control variable voltage unit that represents the engine order input.

15. The combination of claim 3 wherein said means to insert vehicle speed information includes a motor and voltage control unit therefor variable according to an engine order input and wherein said second mentioned means to insert angle of bearing information into said combination of counters comprises a code wheel, a motor mechanically connected to rotate said code wheel, a manual angle of bearing input, a variable voltage unit operated by said manual angle of bearing input and electrically connected to control said motor; a second variable voltage unit connected to said first mentioned variable voltage unit to vary the voltage across the motor control variable voltage unit that represents the engine order input.

16. The combination of claim 4 wherein said means to insert vehicle speed information includes a motor and voltage control unit therefor variable according to an engine order input and wherein said fourth mentioned means to insert angle of bearing information into said combination of counters comprises a code wheel, a motor mechanically connected to rotate said code wheel, a manual angle of bearing input, a variable voltage unit operated by said manual angle of bearing input and electrically connected to control said motor; a second variable voltage unit connected to said first mentioned variable voltage unit to vary the voltage across the motor control variable voltage unit that represents the engine order input.

References Cited in the file of this patent

UNITED STATES PATENTS

| Number | Name | Date |
| --- | --- | --- |
| 1,433,070 | Conners | Oct. 24, 1922 |
| 2,475,314 | Dehmel | July 5, 1949 |